Figure 1:
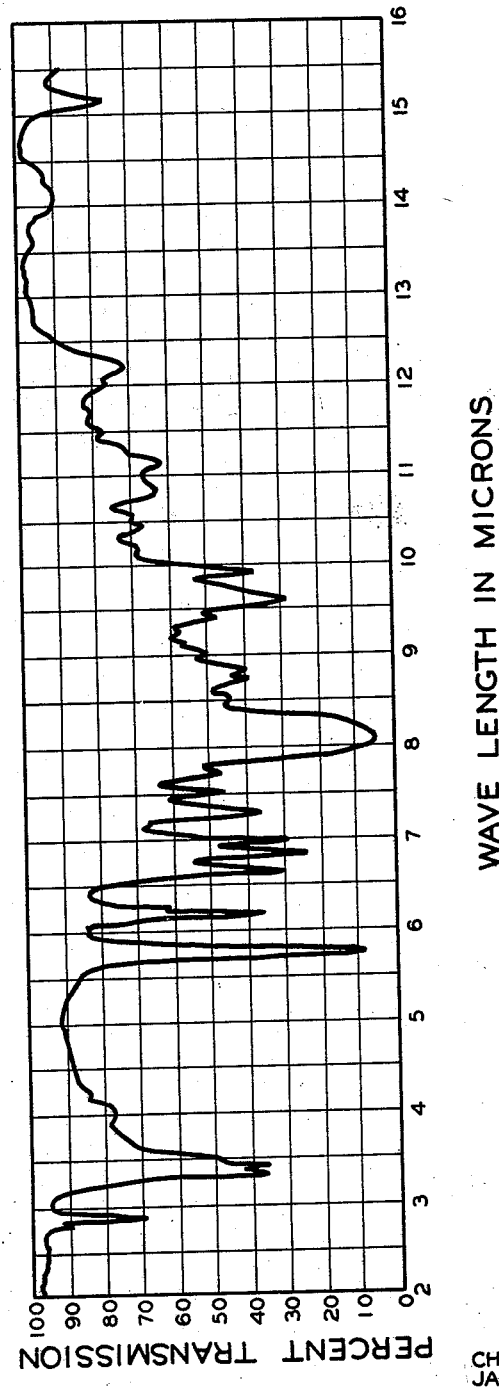

INVENTORS
CHARLES T. BEER
JAMES H. CUTTS
ROBERT L. NOBLE

ATTORNEY.

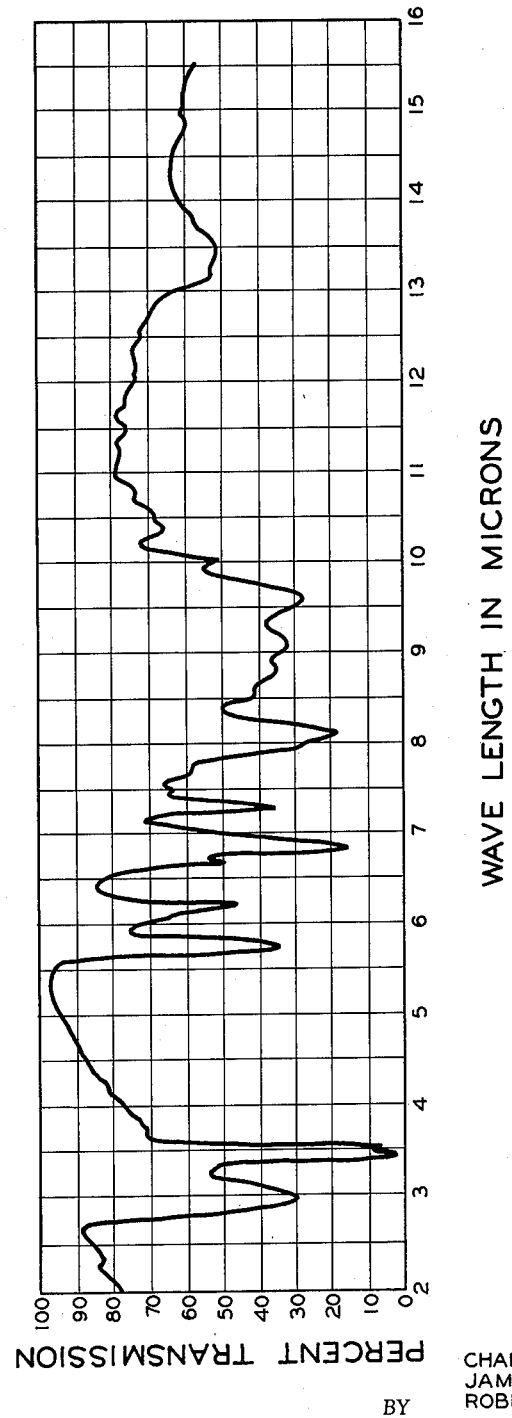

United States Patent Office 3,097,137
Patented July 9, 1963

3,097,137
VINCALEUKOBLASTINE
Charles T. Beer, Vancouver, British Columbia, James H. Cutts, London, Ontario, and Robert L. Noble, Delaware, Ontario, Canada, assignors to Canadian Patents and Development, Ltd., Ottawa, Ontario, Canada, a company
Filed May 19, 1960, Ser. No. 30,315
6 Claims. (Cl. 167—65)

This is a continuation-in-part of our copending U.S. patent application Serial Number 777,627, filed December 2, 1958, now abandoned.

This invention relates to novel compositions, and to methods for their use.

The novel compositions of this invention comprise a nitrogenous organic base to which we have assigned the name vincaleukoblastine, and the acid addition salts of the base, and therapeutic compositions embodying said base or its salts.

Vincaleukoblastine can be obtained from certain plants of the genus Vinca, belonging to the family Apocynaceae. The acid addition salts of vincaleukoblastine are obtained by customary methods, as by treating the nitrogenous base with an acid in a suitable solvent.

Vincaleukoblastine is a white, microcrystalline compound which melts at about 201–211° C. It is readily soluble in most of the common organic solvents, e.g., acetone, alcohol, ethyl acetate, etc. It is soluble in aromatic hydrocarbon solvents, e.g., benzene and toluene, and in strongly polar solvents, e.g., chloroform and ethylene dichloride. It is sparingly soluble in cyclohexane, but is substantially insoluble in water, and in aliphatic hydrocarbon solvents such as hexane.

Vincaleukoblastine gives a precipitate with Mayer's reagent, gives an orange-red color with Dragendorff's reagent, and gives a precipitate with picric acid.

Elemental analyses by standard microanalytical procedures of samples of purified vincaleukoblastine, which prior to analysis were thoroughly dried, have given the following percentage composition:

| Element | Percent |
|---|---|
| Carbon | 68.15 |
| Hydrogen | 7.44 |
| Nitrogen | 6.65 |
| Oxygen | 18.05 |

The molecular weight of vincaleukoblastine calculated from electrometric titration data was found to be 807. The molecular weight, determined from X-ray data, was found to be 813.8. As calculated from the above analytical values, the molecular formula of vincaleukoblastine is $C_{46}H_{58}O_9N_4$.

The ultraviolet absorption spectrum of a solution of vincaleukoblastine in 95 percent ethanol gives the following values of molar absorptivity at a pH below pH 6.

$$\log_{10} a_M(214 \text{ m}\mu) = 4.74 \text{ (maximum)}$$
$$\log_{10} a_M(259 \text{ m}\mu) = 4.22 \text{ (maximum)}$$
$$\log_{10} a_M(288 \text{ m}\mu) = 4.15 \text{ (shoulder)}$$
$$\log_{10} a_M(296 \text{ m}\mu) = 4.12 \text{ (shoulder)}$$
$$\log_{10} a_M(310 \text{ m}\mu) = 3.88 \text{ (shoulder)}$$

In methanol solution the specific rotation of vincaleukoblastine is as follows:

$$[\alpha]_D^{23°} = -32° \text{ (c.} = 0.88)$$

An electrometric titration of vincaleukoblastine in dimethylformamide-water solution (2:1 v./v.) reveals the presence of two titratable groups of pK'a 5.0 and 7.0.

The infrared absorption spectrum of a chloroform solution of vincaleukoblastine, shown in FIG. I of the accompanying drawings, exhibits over the range of about 2–16 microns characteristic peaks at the following wavelengths expressed in microns: 2.82, 2.91, 3.41, 3.51, 5.75, 6.19, 6.27, 6.66, 6.86, 6.98, 7.30, 7.52, 7.75, 8.15, 8.57, 8.75, 8.87, 9.04, 9.17, 9.28, 9.42, 9.63, 9.92, 10.22, 10.45, 10.58, 10.85, 11.15, 11.32, 11.50, 11.72, 12.00, 12.20.

A powder X-ray diffraction pattern of a sample of vincaleukoblastine base which was recrystallized from ether and which contained one mol of ether as a solvate, gave the interplanar spacings listed below. The pattern was obtained using vanadium-filtered chromium radiation, and a wavelength value of 2.2896 A. in calculating the interplanar spacings.

| $d$ | $I/I_1$ |
|---|---|
| 9.70 | 1.00 |
| 8.59 | 1.00 |
| 7.42 | 0.40 |
| 7.14 | 0.40 |
| 5.88 | 0.10 |
| 5.76 | 0.10 |
| 5.49 | 0.40 |
| 4.80 | 0.40 |
| 4.60 | 0.20 |
| 4.16 | 0.20 |
| 4.00 | 0.60 |
| 3.56 | 0.10 |
| 3.42 | 0.20 |

Chromatography of vincaleukoblastine on filter paper impregnated with a buffer of pH 3, using n-amyl alcohol saturated with a buffer of pH 3, shows an $R_f$ value of about 0.6–0.65. Chromatography of vincaleukoblastine on filter paper treated with dilute phosphoric acid using isobutanol saturated with 1 percent phosphoric acid as a solvent, shows an $R_f$ value of about 0.25–0.3. The moving fronts of the vincaleukoblastine on the filter paper appear as dark areas when examined in short wavelength ultraviolet light. They appear as brown colorations when treated with Dragendorff's reagent.

Vincaleukoblastine sulfate monohydrate, a characteristic acid addition salt of vincaleukoblastine, possesses the following properties:

It crystallizes in the form of fine needles which melt with decomposition at 284–285° C. after preliminary softening and darkening at about 245° C. Prior to drying in vacuo, the sulfate salt contains about twelve molecules of water of hydration. It is soluble in water and methanol, but is only very slightly soluble in ethanol. It is substantially insoluble in hydrocarbon solvents.

Elemental analyses by standard microanalytical procedures of samples of vincaleukoblastine sulfate monohydrate which were dried in vacuo at elevated temperature prior to analysis, have given the following percentage compositions:

| Elements | Percent |
|---|---|
| Carbon | 59.68 |
| Hydrogen | 6.72 |
| Nitrogen | 6.19 |
| Sulfur | 3.37 |
| Oxygen | 24.27 |

As calculated from the above analytical values and using the vincaleukoblastine molecular weight given earlier herein, the empirical formula of the sulfate salt is $C_{46}H_{58}O_9N_4 \cdot H_2SO_4 \cdot H_2O$.

Vincaleukoblastine sulfate in methanol solution gives the following specific rotation:

$$[\alpha]_D^{22°} = -28° \text{ (c.} = 1.01)$$

The infrared absorption spectrum of a mineral oil mull of vincaleukoblastine sulfate, shown in FIG. II of the accompanying drawings, exhibits over the range of about 2–16 microns characteristic peaks at the following wavelengths expressed in microns: 2.99, 5.74, 6.18, 6.65, 7.48, 7.67, 8.13, 8.56, 8.78, 9.12, 9.60, 10.03, 10.37, 10.59, 10.80, 11.46, 11.75, 12.20, 13.15, 13.47.

A powder X-ray diffraction pattern of vincaleukoblastine sulfate using vanadium-filtered chromium radiation, and a wavelength value of 2.2896 A in calculating the interplanar spacings, gives the following values:

| d | I/I₁ |
|---|---|
| 12.9 | 1.00 |
| 11.7 | 1.00 |
| 10.7 | 0.02 |
| 9.35B | 0.40 |
| 8.45 | 0.08 |
| 7.82 | 0.08 |
| 7.10 | 0.80 |
| 6.23 | 0.08 |
| 5.43 | 0.08 |
| 5.09 | 0.30 |
| 4.83 | 0.04 |
| 4.53 | 0.40 |
| 4.34 | 0.08 |
| 4.13 | 0.08 |
| 3.95 | 0.04 |
| 3.73 | 0.02 |
| 3.57 | 0.02 |
| 3.41 | 0.12 |
| 3.28 | 0.04 |
| 3.21 | 0.04 |
| 3.07 | 0.04 |
| 3.03 | 0.04 |
| 2.83 | 0.04 |
| 2.76 | 0.04 |
| 2.71 | 0.04 |
| 2.62 | 0.02 |

B indicates broad line

As noted above, vincaleukoblastine can be obtained from plants belonging to the family Apocynaneae, and particularly the genus Vinca. An especially productive source material is *Vinca rosea*. Vincaleukoblastine is obtained from the plant source by treating the leaves, bark or stems of the plant with an aqueous or aqueous-alcoholic acid medium, thereby causing vincaleukoblastine to appear in solution in the acid medium in the form of a soluble acid addition salt. The vincaleukoblastine is separated from the acid medium by extractive processes, and is purified by chromatography on aluminum oxide. It is separated from the aluminum oxide by gradient elution technique.

Vincaluekoblastine has the physiological property of causing a marked decrease in the total number of blood cells in the bone marrow, especially the myeloid element. It causes a change in the bone marrow with virtual depression of the blast and other blood-forming cells. Thus, vincaleukoblastine and its pharmaceutically acceptable, i.e., nontoxic, acid addition salts can be usefully employed as palliatives in the treatment of diseases in which there is an abnormal increase in blood-forming tissues.

Vincaleukoblastine and its pharmaceutically acceptable, i.e., nontoxic, acid addition salts, can be usefully employed as palliatives in the treatment of certain malignancies, for example, Hodgkins' disease and choriocarcinoma in women.

Therapeutic response to vincaleukoblastine and its salts is generally evoked by their administration in a dose amount of about 0.1 to about 2 milligrams per kilogram of body weight of the subject being treated. A positive therapeutic response is indicated by a reduction in the circulating white blood cells. The actual dose amount and dosage regimen are dependent upon the type of patient, the severity and kind of malignancy, and the numerous other factors which make up the general clinical picture as it appears to the attending physician.

The presently preferred method of administering vincaleukoblastine and its salts is by intravenous clysis, this method commonly being employed for the administration of other anti-tumor agents, e.g., the nitrogen mustards. By such procedure the likelihood of damage to the blood vessels and resulting phlebitis is minimized.

For ease in calculating the dose to be administered, the vincaleukoblastine base or salt preferably is dispersed in a physiologically compatible, liquid extending medium in such amount as will provide a concentration equivalent to about 1 milligram of vincaleukoblastine per milliliter of dispersion. In the event a water-soluble salt of vincaleukoblastine is employed as the therapeutic agent, the dispersing medium preferably is sterile, pyrogen-free water or physiological saline solution. However, other dispersing media can be employed, for example, propylene glycol. The dispersing medium desirably is water-miscible so that it will mix readily with the aqueous solution, usually a glucose solution, employed as the clysis vehicle.

EXAMPLE 1

Preparation of Vincaleukoblastine Sulfate 2 k. of dried leaves of *Vinca rosea* are disintegrated in a mixture consisting of 5499 ml. of ethanol, 600 ml. of water, and 600 ml. of acetic acid. The mixture is warmed at about 70° C. for about 45 minutes, is allowed to settle, and the bulk of the liquid is decanted. The residue is extracted three times at about 70° C. with 1600 ml. portions of 90 percent ethanol. The acid and alcoholic extracts are combined and are evaporated in vacuo at about 50° C.

The viscous residue is extracted at about 70° C. with one 250 ml. portion and four 150 ml. portions of 2 percent hydrochloric acid. The acidic extracts are combined, are adjusted to about pH 4 with aqueous sodium hydroxide solution and are centrifuged. The supernatant liquid is extracted three times with 800 ml. portions of benzene, and the aqueous material is adjusted to about pH 7 with aqueous sodium hydroxide solution. It is then extracted four times with 1 l. portions of benzene. The benzene extracts are combined and are evaporated to a volume of about 600 ml. The reduced-volume benzene solution is washed with three 150 ml. portions of 2 percent aqueous sodium hydroxide solution, followed by three washings with water at about pH 7–7.5. The benzene solution is evaporated to dryness in vacuo at about 55° C., yielding about 4.78 g. of a crude material containing vincaleukoblastine.

4.66 g. of the crude material are dissolved in 45 ml. of benzene-methylene chloride solvent mixture (65:35 v./v.) and the solution is passed over a column containing 320 g. of substantially neutral activated aluminum oxide which had previously been partially deactivated by treatment with 40 ml. of water. The vincaleukoblastine adsorbed on the aluminum oxide is eluted by gradient elution technique, starting with a solvent mixture consisting of 65 percent benzene and 35 percent methylene chloride (v./v.). The proportion of methylene chloride in the solvent mixture is gradually increased as the elution proceeds, so that at the end of the passage of 17 l. of solvent through the column, the percentage of methylene chloride has been linearly increased to a final value of 97.5 percent (v./v.). The effluent is collected in fractions which are assayed for their vincaleukoblastine content by the paper chromatographic procedure described above. They can also be assayed by a biological procedure which comprises administering intravenously to rats an aliquot of each fracton in 50 percent aqueous propylene glycol, and observing the effect on the peripheral white blood cell count of the rats over a period of four days. The fractions containing vincaleukoblastine cause a substantial reduction in the cell count, especially the polymorphonucleated leucocytes.

In the extraction procedure described above, vincaleukoblastine first appears when about 7500 ml. of elution solvent have been passed through the column, and its elution is substantially complete after about 11500 ml. of elution solvent have passed through the column.

Those fractions containing vincaleukoblastine are combined and are evaporated to dryness in vacuo, yielding a residue which is crude vincaleukoblastine.

345 mg. of crude vincaleukoblastine obtained as described above are suspended in 8 ml. of water, and the mixture is acidified to about pH 3.8 with dilute sulfuric acid. The solution is filtered to remove a slight haze, and is evaporated to dryness in vacuo over concentrated sulfuric acid. The residue comprising vincaleukoblastine sulfate is dissolved in about 5 ml. of methanol, the solution is filtered, and the filtrate is evaporated to a volume of about 1 ml. Upon dilution of the filtrate with 15 ml. of boiling ethanol and cooling, the sulfate salt of vincaleukoblastine sulfate separates in the form of small needles.

EXAMPLE 2

Preparation of Vincaleukoblastine

Vincaleukoblastine is obtained from vincaleukoblastine sulfate by dissolving 20 mg. of the sulfate salt in 5 ml. of water and adjusting the solution to about pH 7.5 with dilute aqueous sodium bicarbonate solution to cause precipitation of the vincaleukoblastine base. The precipitated base is extracted with methylene chloride, the extract is washed once with water, and is evaporated to dryness. The residue of vincaleukoblastine is dissolved in a minimum amount of boiling cyclohexane. Upon cooling the solution the vincaleukoblastine separates as a microcrystalline solid.

EXAMPLE 3

Preparation of Vincaleukoblastine Salts

Vincaleukoblastine base is converted into its hydrochloride salt by suspending 100 mg. of the base in 5 ml. of water, and adding .01 N hydrochloric acid dropwise until the base is all dissolved. Evaporation of the aqueous solution in vacuo at room temperature yields a solid residue of the hydrochloride salt of vincaleukoblastine.

Other acid addition salts, for example, the hydrobromide, phosphate, maleate, and succinate salts can be prepared in a similar manner, but preferably the organic acid addition salts are prepared in organic solvent solution rather than in water.

We claim:
1. A member of the group consisting of vincaleukoblastine and its nontoxic acid addition salts, said vincalukoblastine being in pure state a white, microcrystalline compound which melts at about 201–211° C., showing upon analysis the presence of 68.15 percent carbon, 7.44 percent hydrogen, 6.65 percent nitrogen, and 18.05 percent oxygen, the analytical data establishing the molecular formula $C_{46}H_{58}O_9N_4$, an ultraviolet absorption spectrum in ethanol showing maxima at 214 m$\mu$ and 259 m$\mu$ with shoulders at 288, 296 and 310 m$\mu$, a specific rotation in methanol of $[\alpha]_D^{23°}=-32°$ (c.=0.88), two titratable groups of pK' a 5.0 and 7.0 in dimethylformamide-water solution (2:1 v./v.) and exhibiting in chloroform solution in the infrared region over the range of about 2–16 microns characteristic peaks at the following wavelengths expressed in microns: 2.82, 2.91, 3.41, 3.51, 5.75, 6.19, 6.27, 6.66, 6.86, 6.98, 7.30, 7.52, 7.75, 8.15, 8.57, 8.75, 8.87, 9.04, 9.17, 9.28, 9.42, 9.63, 9.92, 10.22, 10.45, 10.58, 10.85, 11.15, 11.32, 11.50, 11.72, 12.00, 12.20.

2. The novel compound, vincaleukoblastine, as characterized in claim 1.

3. The sulfate salt of the novel compound, vincaleukoblastine, as characterized in claim 1.

4. A therapeutic composition in dosage unit form comprising a physiologically compatible liquid extending medium and a therapeutically effective amount of a member of the group consisting of vincaleukoblastine and acid addition salts thereof, said vincaleukoblastine in pure state being a white, microcrystalline compound which melts at about 201–211° C., showing upon analysis the presence of 68.15 percent carbon, 7.44 percent hydrogen, 6.65 percent nitrogen, and 18.05 percent oxygen, the analytical data establishing the molecular formula $C_{46}H_{58}O_9N_4$, an ultraviolet absorption spectrum in ethanol showing maxima at 214 m$\mu$ and 259 m$\mu$ with shoulders at 288, 296 and 310 m$\mu$, specific rotation in methanol of $[\alpha]_D^{23°}=-32°$ (c.=0.88), two titratable groups of pK' a 5.0 and 7.0 in dimethylformamide-water solution (2:1 v./v.) and exhibiting in chloroform solution in the infrared region over the range of about 2–16 microns characteristic peaks at the following wavelengths expressed in microns: 2.82, 2.91, 3.41, 3.51, 5.75, 6.19, 6.27, 6.66, 6.86, 6.98, 7.30, 7.52, 7.75, 8.15, 8.57, 8.75, 8.87, 9.04, 9.17, 9.28, 9.42, 9.63, 9.92, 10.22, 10.45, 10.58, 10.85, 11.15, 11.32, 11.50, 11.72, 12.00, 12.20.

5. A therapeutic composition according to claim 4 in which the physiologically compatible extending medium is a sterile aqueous medium.

6. The method of treating malignancies which comprises administering to a cancer patient in therapeutically effective amount, a compound as defined in claim 1.

References Cited in the file of this patent

Beer: British Empire Cancer Campaign, 33rd Annual Report, pages 487–488, 1955.

Cancer Chemotherapy Reports, vol. 12, June 1961, pages 109–129.

Cutts et al.: Rev. Canad. Biol., 16:476, 1957.